(12) United States Patent
Modarres et al.

(10) Patent No.: US 9,035,899 B2
(45) Date of Patent: May 19, 2015

(54) SYSTEMS AND METHODS FOR PIEZO-BASED HAPTIC FEEDBACK

(71) Applicant: Immersion Corporation, San Jose, CA (US)

(72) Inventors: Ali Modarres, Montreal (CA); Juan Manuel Cruz-Hernandez, Montreal (CA); Danny Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/246,377

(22) Filed: Apr. 7, 2014

(65) Prior Publication Data

US 2014/0306904 A1   Oct. 16, 2014

Related U.S. Application Data

(63) Continuation of application No. 12/512,191, filed on Jul. 30, 2009, now Pat. No. 8,730,182.

(51) Int. Cl.
*G06F 3/041* (2006.01)
*G06F 3/01* (2006.01)
*H01L 41/04* (2006.01)

(52) U.S. Cl.
CPC .............. *G06F 3/016* (2013.01); *G06F 3/041* (2013.01); *H01L 41/04* (2013.01)

(58) Field of Classification Search
CPC ... G06F 3/04865; G06F 3/0487; G06F 3/044; G06F 3/04875; G06F 3/045
USPC .......................... 345/156–158, 173–179, 204; 178/18.01–18.04; 340/407.1
See application file for complete search history.

(56) References Cited

U.S. PATENT DOCUMENTS

| | | |
|---|---|---|
| 6,091,406 A | 7/2000 | Kambara et al. |
| 6,359,371 B1 | 3/2002 | Perkins et al. |
| 6,771,237 B1 | 8/2004 | Kalt |
| 7,291,386 B2 | 11/2007 | Richter et al. |
| 7,400,319 B2 | 7/2008 | Nakayama et al. |
| 7,450,110 B2 | 11/2008 | Shahoian et al. |
| 7,579,758 B2 | 8/2009 | Maruyama et al. |
| 7,667,371 B2 | 2/2010 | Sadler et al. |
| 8,325,159 B2 | 12/2012 | Kent et al. |
| 8,330,732 B2 | 12/2012 | Nutaro et al. |
| 8,345,013 B2 | 1/2013 | Heubel et al. |
| 8,395,587 B2 | 3/2013 | Cauwels et al. |

(Continued)

FOREIGN PATENT DOCUMENTS

DE   202009004561   6/2009
EP       2112576    10/2009

OTHER PUBLICATIONS

Search Report and Written Opinion mailed Apr. 27, 2010 for corresponding PCT Application No. PCT/US2009/057097.

(Continued)

*Primary Examiner* — Kimnhung Nguyen
(74) *Attorney, Agent, or Firm* — Kilpatrick Townsend & Stockton LLP

(57) ABSTRACT

Systems and methods for piezo-based haptic feedback are disclosed. For example, one described apparatus for piezo-based haptic feedback includes a polymer matrix, and a piezoelectric actuator at least partially embedded within the polymer matrix, the piezoelectric actuator configured to output a haptic effect.

20 Claims, 5 Drawing Sheets

(56) References Cited

U.S. PATENT DOCUMENTS

| | | | |
|---|---|---|---|
| 8,686,951 | B2 | 4/2014 | Vartanian et al. |
| 2004/0203503 | A1 | 10/2004 | Rollins et al. |
| 2006/0007136 | A1 | 1/2006 | Nakagome |
| 2008/0297340 | A1* | 12/2008 | Popa et al. ................. 340/539.1 |
| 2011/0266340 | A9 | 11/2011 | Block et al. |
| 2011/0304569 | A1 | 12/2011 | Kai et al. |

OTHER PUBLICATIONS

International Preliminary Report on Patentability mailed Feb. 9, 2012 for corresponding PCT Application No. PCT/US2009/057097.

* cited by examiner

SYSTEMS AND METHODS FOR PIEZO-BASED HAPTIC FEEDBACK

CROSS-REFERENCE TO RELATED APPLICATIONS

This Application is a continuation of and claims priority to U.S. patent application Ser. No. 12/512,191, filed on Jul. 30, 2009, entitled "Systems and Methods for Piezo-Based Haptic Feedback," the entirety of which is hereby incorporated by reference herein.

FIELD OF THE INVENTION

The present invention generally relates to haptic feedback, and more particularly to systems and methods for piezo-based haptic feedback.

BACKGROUND

Piezoelectric actuators may offer advantages over conventional actuators. However, piezoelectric actuators may be difficult to integrate into some haptic feedback systems. Accordingly, there is a need for systems and methods for piezo-based haptic feedback.

SUMMARY

Embodiments of the present invention provide systems and methods for piezo-based haptic feedback. For example, in one embodiment, an apparatus for piezo-based haptic feedback comprises a polymer matrix, and a piezoelectric actuator at least partially embedded within the polymer matrix, the piezoelectric actuator configured to output a haptic effect.

This illustrative embodiment is mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for piezo-based haptic feedback.

Illustrative Embodiment of Piezo-Based Haptic Feedback

One illustrative embodiment of the present invention comprises a mobile device such as a mobile phone. In the illustrative embodiment, the mobile device comprises the Samsung SGH-i710 mobile computer equipped with Immersion Corporation's VibeTonz® vibrotactile feedback system. In another embodiment, the mobile device comprises Immersion Corporations TouchSense® Technology system also known as Immersion TouchSense® vibrotactile feedback system. Other mobile devices and haptic feedback systems, may be utilized.

The mobile phone comprises a housing which contains a touch-screen display. The mobile phone also comprises a processor and memory. The processor is in communication with both the memory and the touch-screen display. To provide haptic feedback, the illustrative mobile phone also comprises a piezoelectric actuator in communication with the processor. The piezoelectric actuator is configured to receive a haptic signal from the processor and, in response to the haptic signal, output a haptic feedback effect. In the illustrative embodiment, as the user interacts with the mobile device, the processor generates the appropriate haptic signal and transmits the signal to the piezoelectric actuator. The piezoelectric actuator then produces the appropriate haptic effect, which may be output to the user through the touch-screen.

In the illustrative device, the piezoelectric actuator is embedded, at least partially, in a polymer matrix, such as silicone. The polymer matrix protects the actuator but still allows it to expand and contract in response to changes in voltage.

In the illustrative device, the piezoelectric actuator comprises two surfaces opposite one another, as well as sides that connect the two surfaces. One surface and the sides may be embedded in the polymer matrix while the second surface remains uncovered. The uncovered surface may then be affixed to the device, e.g., to the touch-screen or the housing, using an adhesive. For instance in such a device, the polymer matrix is coupled to a base in the housing by an adhesive. In some embodiments, a suitable adhesive may comprise high flexibility, shear strength, and peel resistance. In some embodiments, a suitable adhesive may comprise Loctite E-120HP, Loctite E214HP, Huntsman HT, etc.

This illustrative example is given to introduce the reader to the general subject matter discussed herein. The invention is not limited to this example. The following sections describe various additional embodiments and examples of systems and methods for piezo-based haptic feedback

Illustrative Systems for Piezo-Based Haptic Feedback

Figure 1:
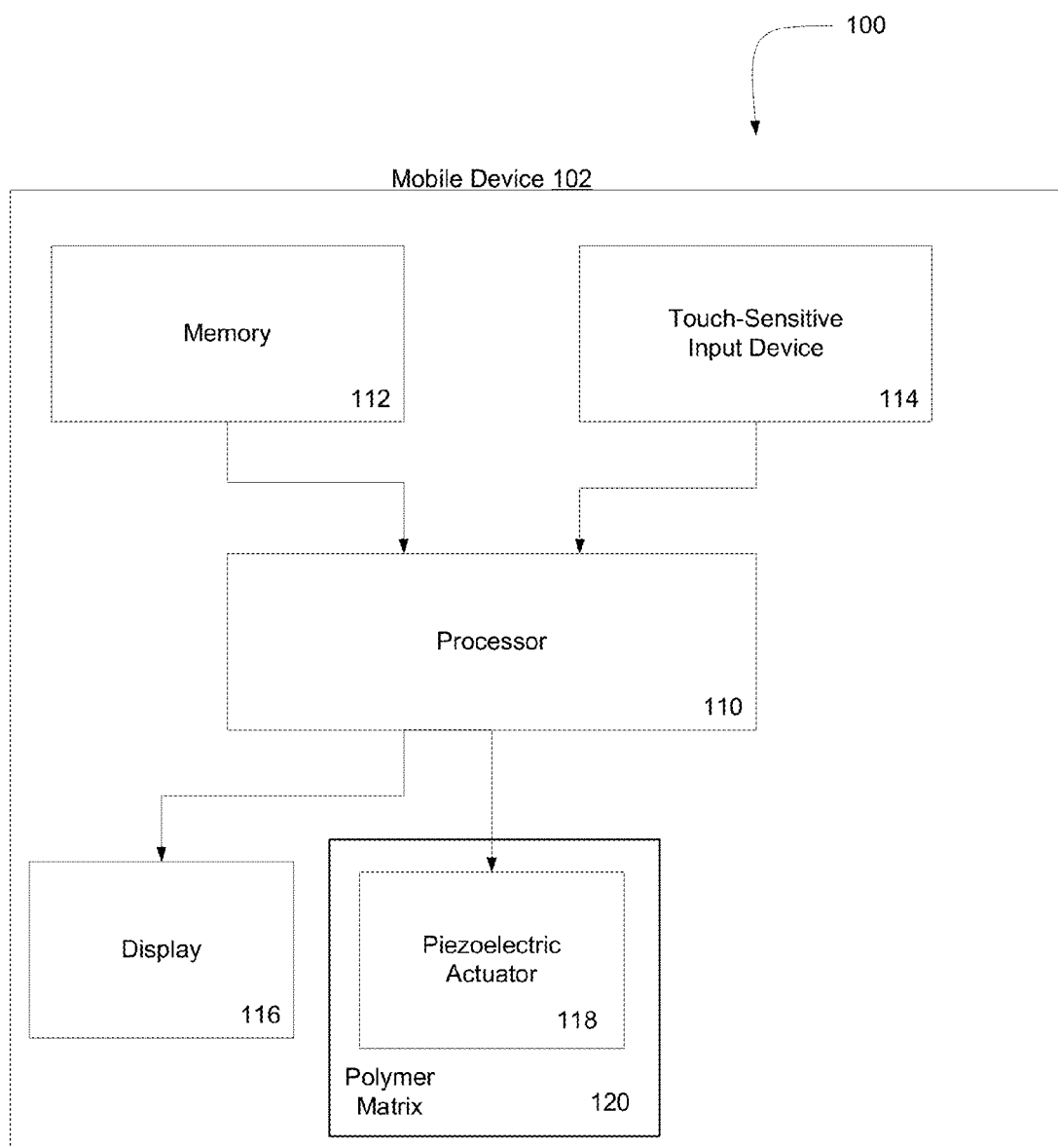
FIG. 1 is a block diagram of a system for piezo-based haptic feedback according to one embodiment of the present invention.

Referring now to the drawings in which like numerals indicate like elements throughout the several Figures, FIG. 1 is a block diagram of a system for piezo-based haptic feedback according to one embodiment of the present invention. The system 100 shown in FIG. 1 comprises a mobile device 102. In other embodiments, the present invention may be implemented in a variety of handheld devices, such as a mobile phone, a personal digital assistant (PDA), or a handheld navigation system. In other embodiments, the present invention may be implemented in an automobile, gaming console, or other electronic device.

Embodiments of the present invention can be implemented in combination with, or may comprise combinations of: digital electronic circuitry, computer hardware, firmware, and software. The mobile device 102 shown in FIG. 1 comprises a processor 110. The processor 110 receives input signals and generates signals for communication, display, and providing haptic feedback. The processor 110 includes or is in communication with one or more computer-readable media, such as memory 112, which may comprise random access memory (RAM).

The processor 110 executes computer-executable program instructions stored in memory 112, such as executing one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that may store instructions, which, when executed by the processor 110, cause it to perform various steps, such as those described herein. Embodiments of computer-readable media may comprise, but are not limited to, an electronic, optical, magnetic, or other storage or transmission device capable of providing the processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 110, and the processing, described may be in one or more structures, and may be dispersed through one or more structures.

Referring still to FIG. 1, the mobile device 102 also comprises a touch-sensitive input device 114 in communication with the processor 110. For example, in some embodiments the touch-sensitive input device may comprise a touch-screen. In the embodiment shown, the touch-sensitive input device 114 senses a user interaction with the device 114 as well as the location of the interaction. One such embodiment comprises a capacitance-based touch-sensitive input device. In other embodiments, touch sensitive input device 114 may comprise a button, switch, or trackball. In still other embodiments, the mobile device 102 may comprise both a touch screen and an additional touch-sensitive input device 114.

The mobile device 102 also comprises a display 116. Display 116 is in communication with processor 110 and is configured to display output from the processor 110 to the user. For instance, in one embodiment, the mobile device 102 comprises a liquid crystal display (LCD) disposed beneath the touch-sensitive input device 114. In some embodiments, the display 116 and touch-sensitive input device 114 may comprise a single, integrated component, such as a touch-screen LCD.

The mobile device 102 also comprises a piezoelectric actuator 118, which is in communication with the processor 110 and configured to output a haptic effect. The processor 110 outputs a haptic signal to the piezoelectric actuator 118, which then outputs a haptic effect based on the haptic signal. For instance, the processor 110 may output a haptic signal designed to cause the piezoelectric actuator to vibrate. In some embodiments, the actuator vibrates between approximately 60 hertz and 300 hertz. In other embodiments, the piezoelectric actuator can be configured to output other types of effects, such as, for example, clicking or popping effects. In one embodiment, the processor 110 generates a haptic signal with a modulating current and/or voltage. This modulation causes the piezoelectric actuator 118 to output a variety of haptic effects. In some embodiments, the piezoelectric actuator is a monolithic piezoelectric actuator. In other embodiments the piezoelectric actuator 118 is a composite piezoelectric actuator.

The piezoelectric actuator 118 shown in FIG. 1 is at least partially embedded in a polymer matrix 120. In some embodiments, the polymer matrix 120 may comprise silicone. For example, in one embodiment, the piezoelectric actuator 118 comprises a first surface and a second surface opposite the first surface. The piezoelectric actuator 118 also comprises sides connecting the two surfaces. And the first surface and the sides are embedded in silicone. In another embodiment, the piezoelectric actuator 118 is substantially completely embedded in silicone. For instance, the piezoelectric actuator 118 may be totally embedded in silicone, but one or more leads may extend through the silicone to communicatively connect the piezoelectric actuator 118 to the processor 110.

While many of the embodiments described herein are described in relation to silicone, the polymer matrix may comprise any of a number of compounds. For instance, the polymer matrix may comprise phosphate, nitrogen, tin, boron, sulfur, or oxygen based polymer matrices, such as polyphosphazene, polysulfide, borazine, polystannane, or polythiazyl. In other embodiments, the polymer matrix may comprise polyurethane, chloroprene rubber, PbTiO3, Eccogel, PVDF, EPDM, vinylidene fluoride, thermoplastic polymer films, special epoxies, Nylon-11, etc.

Such polymer matrices should comprise a relatively high stiffness coefficient and a fairly low damping ratio. The polymer matrix's stiffness coefficient is the ratio of force applied to a polymer matrix, to the distance that force displaces the polymer. Thus, a polymer matrix with a high stiffness coefficient will not flex easily. The polymer matrix's damping ratio is a measure the polymer matrix's ability to transmit an oscillation without dissipating the oscillation's energy. Therefore, a polymer matrix with a low damping ratio will transmit an oscillation with very little loss of energy. By using such a polymer matrix, an embodiment of the present invention may avoid a high degree of absorption and dissipation by the polymer matrix 120 of the vibrational energy generated by the piezoelectric actuator 118.

Figure 2:
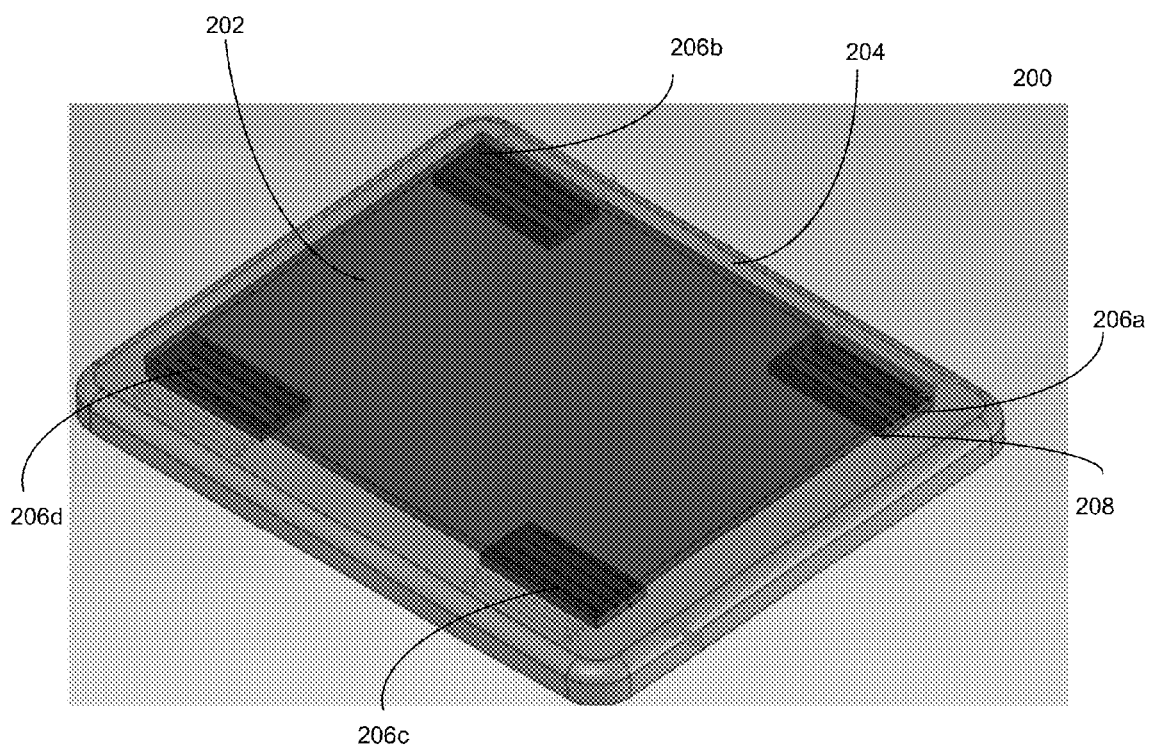
FIG. 2 is a perspective view of an apparatus for piezo-based haptic feedback according to one embodiment of the present invention.

The piezoelectric actuator 118 embedded in the polymer matrix 120 may be included in a variety of apparatuses. FIG. 2 is a perspective view of an apparatus for piezo-based haptic feedback according to one embodiment of the present invention. The apparatus 200 shown in FIG. 2 includes a touch sensitive input device 202. The touch sensitive input device is mounted over an LCD 204 or other base.

The apparatus shown in FIG. 2 also comprises a plurality of piezoelectric actuators 206 embedded in a polymer matrix. The actuators 206 are mounted to the base 204. The piezoelectric actuators 206 may be further attached to the touch sensitive input device 202. For example, in one embodiment, the actuators 206 are mounted to the base 204 using an adhesive mounted at a point 208 on the end of the actuator 206a. In some embodiments, base 204 may comprise a display such as an LCD display, while touch sensitive input device 202 may comprise a touch screen.

Figure 3:
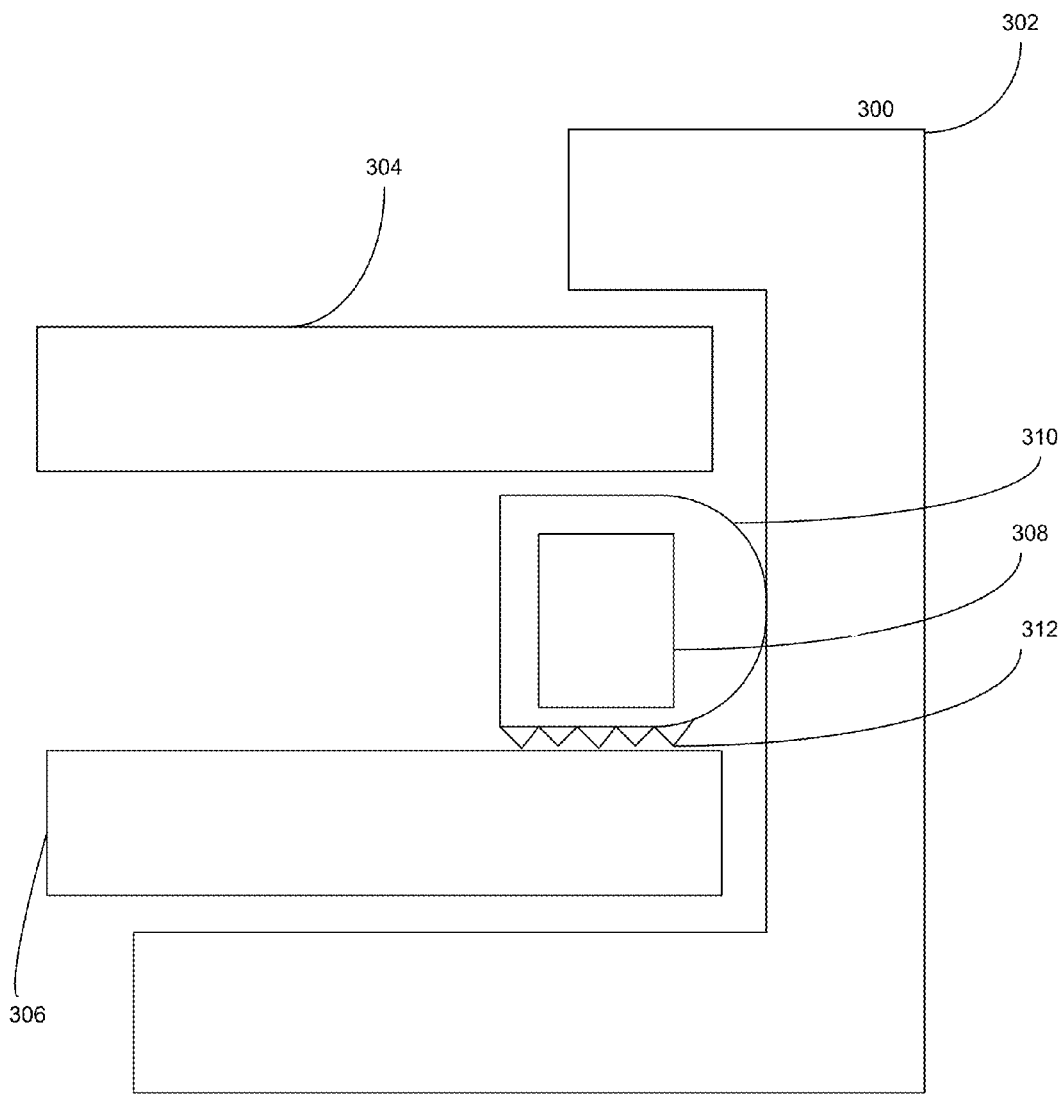
FIG. 3 is a cross section view of a system for piezo-based haptic feedback according to one embodiment of the present invention.

While the piezoelectric actuators 206 shown in FIG. 2 comprise four discreet actuators, in other embodiments, a single piezoelectric actuator may be utilized. In one such embodiment, the actuator can act as a seal between a touch-sensitive input device and a display. FIG. 3 is a cross section view of a system for piezo-based haptic feedback according to one such embodiment of the present invention.

The embodiment shown in FIG. 3 comprises a device 300. The device 300 comprises a housing 302. The housing 302 contains a touch-sensitive input device 304 as well as a display 306. In the embodiment shown, the touch sensitive input device 304 is mounted above the display 306. In such a configuration, a seal is necessary to prevent dust and other contaminants from entering the area between touch-sensitive input device 304 and display 306.

The embodiment shown in FIG. 3 also comprises a piezoelectric actuator 308. The piezoelectric actuator 308 is substantially completely embedded in a polymer matrix 310, such as silicone. The embedded actuator, 308 is coupled to the display 306, such as to a frame of the display 306, by a layer of adhesive 312. When assembled, the embedded actuator 308 in combination with the adhesive layer 312 forms a seal between the touch-sensitive input device 304 and display 306. The adhesive layer 312 may be bonded along substantially an entire surface (e.g., the surface of polymer matrix 310 which is bonded to display 306) or along multiple surfaces of the embedded actuator 308 (e.g., along one surface of polymer matrix 310 and a surface opposite that surface). Such an embodiment might be referred to as a "haptic tape." In some embodiments, a haptic tape may comprise a pre-applied adhesive covered by a protective layer, such as paper. When the haptic tape is installed, the protective layer removed, the haptic tape put into position, and thereafter held in place by the pre-applied adhesive.

Illustrated Method for Creating a System with Piezo-Based Haptic Feedback

Figure 4:
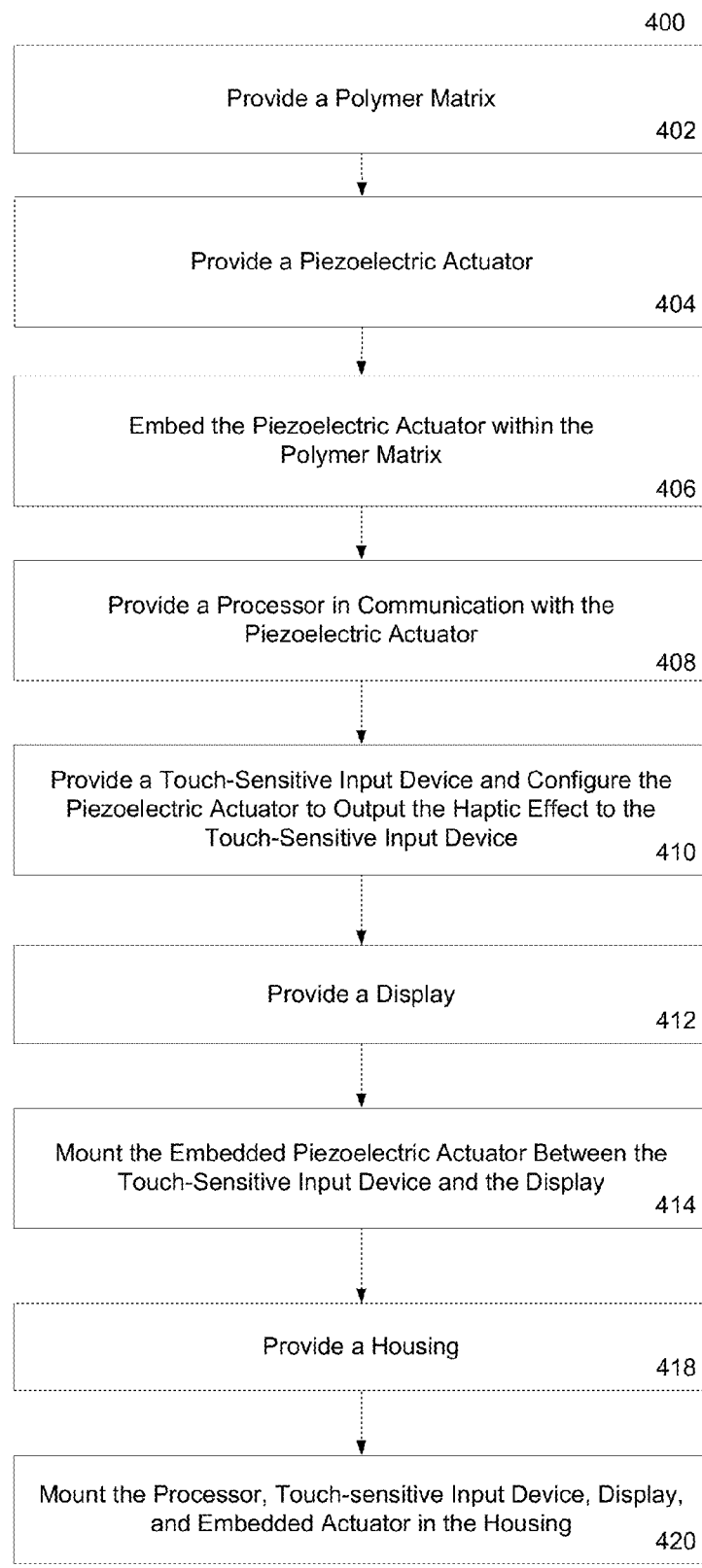
FIG. 4 is a flow diagram of a method for creating a system with piezo-based haptic feedback according to one embodiment of the present invention.

Embodiments of the present invention may be constructed in a variety of ways. FIG. 4 is a flow diagram of a method for creating a system with piezo-based haptic feedback according to one embodiment of the present invention. In the embodiment shown, the process 400 begins with providing a polymer matrix 402. The polymer matrix may be, for example, silicone.

The process continues with providing a piezoelectric actuator 404. In a completed device, the piezoelectric actuator may be configured to output a haptic effect. In some embodiments, the piezoelectric actuator comprises a monolithic piezoelectric actuator; in other embodiments it may comprise a composite piezoelectric actuator.

The piezoelectric actuator is then embedded within the polymer matrix 406. For example, in one method, rubber casting or plastic injection technology is utilized. The ceramic strips of the piezoelectric actuator are fixed in a casting mold, and then uncured silicone is poured into the mold, embedding the piezoelectric within the silicone.

The process continues by providing a processor in communication with the piezoelectric actuator 408. The processor is capable of generating a haptic signal and transmitting the haptic signal to the piezoelectric actuator, which will output a haptic effect based, at least in part, on the haptic signal.

At step 410, the process continues by providing a touch sensitive input device in communication with the processor and configuring the piezoelectric actuator to output a haptic effect to the touch-sensitive input device. In other embodiments, the actuator may be configured to output the haptic effect to another structure, such as a housing. In some embodiments the touch sensitive input device may comprise a touch screen.

The process continues by providing a display in communication with the processor 412. The processor can then send display signals to the display to causing it to output images to the user.

In the process shown in FIG. 4, the embedded piezoelectric actuator is then mounted between the touch-sensitive input device and the display 414. In one embodiment of the illustrated method, a plurality of embedded actuators are mounted between the touch-sensitive input device and the display. In other embodiments, a single embedded actuator is used to seal the space between the touch-sensitive input device and the display.

The method continues with providing a housing 418. Each of the processor, touch-sensitive input device, display, and embedded actuator are then mounted or installed in the housing 420. For example, each of these components may be mounted in a handheld device, such as a mobile phone, and provide haptic feedback to the user of such a device.

Illustrative Application of Piezo-Based Haptic Feedback

Figure 5:
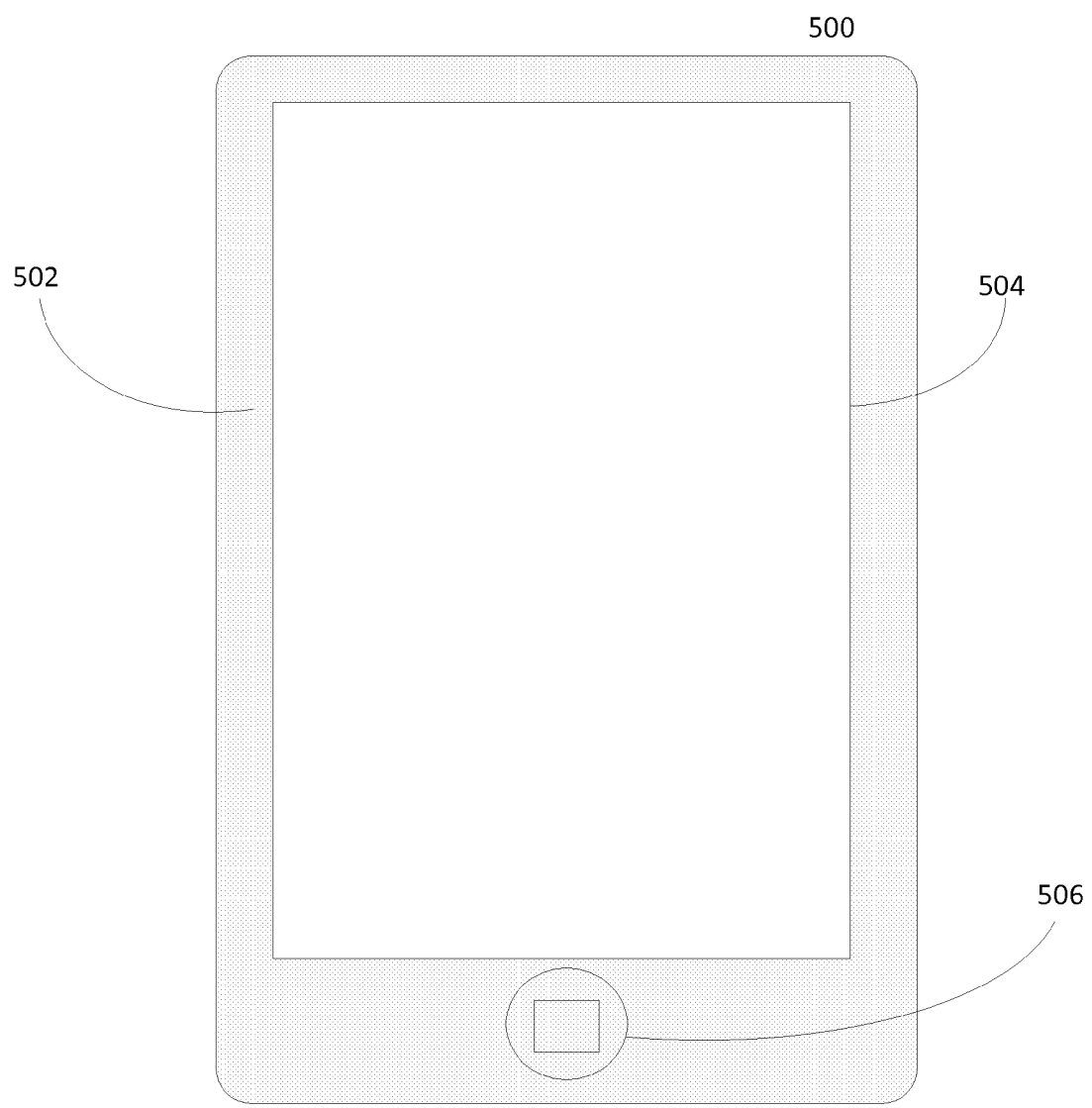
FIG. 5 is an illustration of a device for implementing piezo-based haptic feedback according to one embodiment of the present invention.

A variety of devices may make use of embodiments of the present invention to provide compelling haptic feedback to users of those devices. FIG. 5 is an illustration of one such device which implements piezo-based haptic feedback according to one embodiment of the present invention.

The device 500 shown in FIG. 5 is a mobile phone. The mobile phone 500 comprises a housing 502. The housing 502 contains the various components of the phone, such as the processor, memory, communication interfaces, battery, and other elements.

The mobile phone also comprises a touch screen 504. The touch screen overlays an LCD display. In one embodiment, a piezoelectric actuator is embedded in silicone and mounted between the touch screen and the LCD to provide haptic feedback to a user of the mobile phone 500.

The mobile phone 500 also comprises an touch pad 506. The touch pad 506 provides a second means of input to the mobile phone 500. The processor may use input from both the touch screen 504 and the touch pad 506 to determine the type of haptic effect to output to the user through the embedded piezoelectric actuator. In one embodiment, a piezoelectric actuator is embedded in silicone and mounted between the touch pad 506 and the housing 502 to provide haptic feedback to the user of mobile phone 500.

Advantages of Various Embodiments of the Present Invention

Embodiments of the present invention provide numerous advantages over conventional methods of providing haptic feedback, including conventional methods of utilizing piezoelectric actuators. Piezoelectric actuators are capable of producing a wide range of frequencies, allowing them to support various haptic applications. However, conventional piezoelectric actuators may suffer from integration and coupling issues. Further, they are prone to breakage because they can be both brittle and lack shock-resistance.

In some conventional applications, epoxy bindings are used to mount piezoelectric actuators. In these applications, epoxy is typically applied to the ends of the actuator. The use of epoxy for mounting may be problematic since the actuator's high frequency oscillations result in cyclic load on the contact points, leading to bonding fatigue and ultimately failure. Further, epoxy lacks the temperature and chemical stability found in a polymer matrix, such as silicone.

Further, the mechanical mounting of such conventional actuators, using holes or snaps, may pose a challenge due to the mechanical properties of the actuators. Additionally, mobile devices have limited space, so it may be difficult to use clamps or other physical bindings to mount piezoelectric actuators.

In contrast, embodiments of the present invention provide numerous advantages. For instance, embodiments of the present invention are highly scalable, allowing for modular actuation units that are usable in devices of different form factors. Further, such embodiments of the present invention improve the mechanical robustness of the piezo ceramics. For instance, the polymer matrix serves to protect the piezo. Thus, piezoelectric actuators embedded in a polymer matrix provide greater resistance against both shocks and impacts. And the mounting a piezoelectric actuator in a polymer matrix also improves the durability of the device in terms of resistance against fatigue and failure caused by high frequency cycling loads. Embodiments of the present invention may also improve the piezoelectric actuator's displacement capabilities. The additional displacement is due to the polymer matrix layer's potential for strain amplification.

The overall packaging of an embedded piezoelectric actuator can remain relatively thin so that it may be placed between a touch screen and an LCD. In such an embodiment, the embedded actuator can serve as an actuation unit, a seal, and potentially as a suspension for the touch screen. Such an embodiment is advantageous because it occupies less space than other conventional designs. Such an embodiment may also provide more intense haptic effects since the actuator can serve to isolate the touch-sensitive input device, thereby amplifying the haptic effect.

Some embodiments of the present invention may also provide a simpler method for incorporating the actuator into a device. For example, one embodiment, referred to above as haptic tape, includes an embedded actuator and an adhesive strip. In such an embodiment, the number of components is reduced, therefore simplifying the device. Additionally, the adhesive strip may be pre-applied, and covered with a protective layer, making installation a simpler and cleaner process. Further, the actuator is placed in a protected position in the device, increasing its resistance to impacts and strains.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. An apparatus comprising:
    a polymer matrix;
    a piezoelectric actuator at least partially embedded within the polymer matrix, the piezoelectric actuator configured to output a haptic effect;
    a user input device coupled to the polymer matrix, wherein the piezoelectric actuator is configured to output a haptic effect to the user input device; and
    a display coupled to the user input device and the polymer matrix.

2. The apparatus of claim 1, wherein the piezoelectric actuator comprises one or more of: a monolithic piezoelectric actuator or a composite piezoelectric actuator.

3. The apparatus of claim 1, wherein the polymer matrix comprises silicone.

4. The apparatus of claim 1, wherein the polymer matrix comprises an adhesive material.

5. The apparatus of claim 1, wherein the polymer matrix comprises a low damping ratio.

6. The apparatus of claim 1, wherein the polymer matrix comprises a high stiffness coefficient.

7. The apparatus of claim 1, wherein the piezoelectric actuator is substantially completely embedded within the polymer matrix.

8. The apparatus of claim 1, further comprising a processor in communication with the piezoelectric actuator and configured to generate a haptic signal and transmit the haptic signal to the piezoelectric actuator.

9. The apparatus of claim 1, wherein the user input device comprises a touch-sensitive input device.

10. The apparatus of claim 9, wherein the touch-sensitive input device comprises a touch screen.

11. The apparatus of claim 9, wherein the piezoelectric actuator is mounted between the touch-sensitive input device and the display.

12. The apparatus of claim 11, wherein the polymer matrix forms a seal between the touch-sensitive input device and the display.

13. The apparatus of claim 1, further comprising a housing and wherein the piezoelectric actuator is affixed to the housing.

14. The apparatus of claim 13, wherein the housing comprises a mobile device housing.

15. The apparatus of claim 1, wherein the piezoelectric actuator comprises a first side and a second side opposite the first side and wherein:
    the first side is embedded within the polymer matrix; and
    the second side comprises an adhesive.

16. A method comprising:
    providing a polymer matrix;
    providing a piezoelectric actuator configured to generate a haptic effect;
    at least partially embedding the piezoelectric actuator within a polymer matrix;
    a user input device coupled to the polymer matrix, wherein the piezoelectric actuator is configured to output a haptic effect to the user input device; and
    a display coupled to the user input device and the polymer matrix.

17. The method of claim 16, wherein the piezoelectric actuator comprises one or more of a monolithic piezoelectric actuator or a composite piezoelectric actuator.

18. The method of claim 16, wherein the polymer matrix comprises silicone.

19. The method of claim 16, wherein the polymer matrix comprises one or more of: an adhesive material, a low damping ratio, or a high stiffness coefficient.

20. A system comprising:
    a processor;
    a user input device in communication with the processor and configured to transmit an input signal to the processor;
    a display in communication with the processor and configured to receive a display signal from the processor;
    a piezoelectric actuator in communication with the processor, the piezoelectric actuator:

at least partially embedded within a polymer matrix, the polymer matrix coupled to the display and to the user input device, and configured to output a haptic effect to the user input device in response to a haptic signal from the processor.

* * * * *